US012165570B2

(12) United States Patent
Huang et al.

(10) Patent No.: US 12,165,570 B2
(45) Date of Patent: Dec. 10, 2024

(54) DRIVING CIRCUIT, DRIVING METHOD THEREFOR, AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Yao Huang, Beijing (CN); Weiyun Huang, Beijing (CN); Yue Long, Beijing (CN); Benlian Wang, Beijing (CN); Yuanjie Xu, Beijing (CN); Lili Du, Beijing (CN)

(73) Assignees: Beijing BOE Technology Development Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 0 days.

(21) Appl. No.: 18/036,422

(22) PCT Filed: Nov. 13, 2020

(86) PCT No.: PCT/CN2020/128814

§ 371 (c)(1),
(2) Date: May 11, 2023

(87) PCT Pub. No.: WO2022/099648

PCT Pub. Date: May 19, 2022

(65) Prior Publication Data

US 2024/0021141 A1 Jan. 18, 2024

(51) Int. Cl.
*G09G 3/20* (2006.01)
*G09G 3/32* (2016.01)

(52) U.S. Cl.
CPC ....... *G09G 3/32* (2013.01); *G09G 2300/0426* (2013.01); *G09G 2300/0842* (2013.01); *G09G 2310/0264* (2013.01)

(58) Field of Classification Search
CPC ............. G09G 3/32; G09G 2300/0426; G09G 2300/0842; G09G 2310/0264
(Continued)

(56) References Cited

U.S. PATENT DOCUMENTS 10,497,323 B2 * 12/2019 Zhou .................... G09G 3/3208
2013/0141316 A1 6/2013 Lee et al.
(Continued)

FOREIGN PATENT DOCUMENTS

CN 103137067 A 6/2013
CN 105989796 A 10/2016
(Continued)

OTHER PUBLICATIONS

Decision of Rejection in CN202080002786.4, mailed Sep. 16, 2023, 5 pages.

(Continued)

*Primary Examiner* — Jennifer T Nguyen
(74) *Attorney, Agent, or Firm* — ArentFox Schiff LLP; Michael Fainberg

(57) ABSTRACT

A driving circuit, a driving method therefor, and a display apparatus. The driving circuit comprises: a light emitting device (L), configured to emit light under the control of a driving current (Ids); a driving transistor (M0), configured to generate a driving current (Ids) according to a data signal; a first control circuit (10), configured to provide an initialization signal to a gate of the driving transistor (M0) and a first electrode of the light emitting device (L) in response to a first scanning signal (ga1-N) of an Nth row and a first light emission control signal (em1-N) of the Nth row; and a data writing circuit (20), configured to provide the data signal to the driving transistor (M0) in response to a second scanning signal (ga2-N) of the N-th row.

13 Claims, 4 Drawing Sheets

(58) Field of Classification Search
USPC .......................................................... 345/55
See application file for complete search history.

(56) References Cited

U.S. PATENT DOCUMENTS

| | | | | |
|---|---|---|---|---|
| 2016/0232840 | A1 | 8/2016 | Tseng et al. | |
| 2016/0322446 | A1* | 11/2016 | Park | G09G 3/3233 |
| 2017/0154572 | A1 | 6/2017 | Kim et al. | |
| 2018/0151123 | A1* | 5/2018 | Li | H10K 50/805 |
| 2019/0251896 | A1 | 8/2019 | Cheng | |
| 2019/0295476 | A1 | 9/2019 | Ji et al. | |
| 2020/0082757 | A1 | 3/2020 | Yuan et al. | |
| 2020/0126478 | A1 | 4/2020 | Lee et al. | |
| 2022/0157238 | A1 | 5/2022 | Wang et al. | |
| 2022/0165213 | A1* | 5/2022 | Huang | G09G 3/3233 |

FOREIGN PATENT DOCUMENTS

| | | | |
|---|---|---|---|
| CN | 106816136 | A | 6/2017 |
| CN | 207352944 | U | 5/2018 |
| CN | 108154840 | A | 6/2018 |
| CN | 108597451 | A | 9/2018 |
| CN | 109119027 | A | 1/2019 |
| CN | 109523956 | A | 3/2019 |
| CN | 111724745 | A | 9/2020 |
| KR | 20150069773 | A | 6/2015 |

OTHER PUBLICATIONS

International Search Report and Written Opinion in PCT/CN2020/128814, mailed Jun. 30, 2021, 8 pages.

Office Action in CN202080002786.4, mailed Apr. 21, 2023, 8 pages.

* cited by examiner

DRIVING CIRCUIT, DRIVING METHOD THEREFOR, AND DISPLAY APPARATUS

The present application is a National Stage of International Application No. PCT/CN2020/128814, filed on Nov. 13, 2020, which is hereby incorporated by reference in its entirety.

FIELD

The present disclosure relates to the technical field of display, in particular to a driving circuit, a driving method therefor, and a display apparatus.

BACKGROUND

An organic light emitting diode (OLED), a quantum dot light emitting diode (QLED), a micro light emitting diode (Micro LED), and other electroluminescent diodes have advantages of self-illumination, low energy consumption, etc., and are one of hotspots in the field of an application research of electroluminescent display apparatuses today. In a general electroluminescent display apparatus, a driving circuit is used to drive an electroluminescent diode to emit light. However, due to process limitations, a brightness adjustment range of the electroluminescent diode is limited.

SUMMARY

A driving circuit provided by an embodiment of the present disclosure includes: a light emitting device, configured to emit light under control of a driving current; a driving transistor, configured to generate the driving current according to a data signal; a first control circuit, configured to provide an initialization signal to a gate of the driving transistor and a first electrode of the light emitting device respectively in response to a first scanning signal of an $N^{th}$ row and a first light emitting control signal of the $N^{th}$ row, N being an integer; and a data writing circuit, configured to provide the data signal to the driving transistor in response to a second scanning signal of the $N^{th}$ row.

In some examples, the first control circuit includes: a first sub control circuit, electrically connected to a first scanning signal end of the $N^{th}$ row, a first light emitting control signal end of the $N^{th}$ row, an initialization signal end, and the gate of the driving transistor respectively, and configured to provide the initialization signal loaded at the initialization signal end to the gate of the driving transistor in response to the first scanning signal at the first scanning signal end of the $N^{th}$ row and the first light emitting control signal at the first light emitting control signal end of the $N^{th}$ row; a second sub control circuit, electrically connected to the first scanning signal end of the $N^{th}$ row, and the gate and a second terminal of the driving transistor respectively, and configured to conduct the gate with the second terminal of the driving transistor in response to the first scanning signal at the first scanning signal end of the $N^{th}$ row; and a third sub control circuit, electrically connected to the first light emitting control signal end of the $N^{th}$ row, the second terminal of the driving transistor, and the first electrode of the light emitting device respectively, and configured to conduct the second terminal of the driving transistor with the first electrode of the light emitting device in response to the first light emitting control signal at the first light emitting control signal end of the $N^{th}$ row.

In some examples, the first sub control circuit includes a first transistor and a second transistor; a gate of the first transistor is electrically connected to the first scanning signal end of the $N^{th}$ row, a first terminal of the first transistor is electrically connected to the initialization signal end, and a second terminal of the first transistor is electrically connected to a first terminal of the second transistor; and a gate of the second transistor is electrically connected to the first light emitting control signal end of the $N^{th}$ row, and a second terminal of the second transistor is electrically connected to the gate of the driving transistor.

In some examples, the second sub control circuit includes a third transistor; and a gate of the third transistor is electrically connected to the first scanning signal end of the $N^{th}$ row, a first terminal of the third transistor is electrically connected to the gate of the driving transistor, and a second terminal of the third transistor is electrically connected to the second terminal of the driving transistor.

In some examples, the third sub control circuit includes a fourth transistor; and a gate of the fourth transistor is electrically connected to the first light emitting control signal end of the $N^{th}$ row, a first terminal of the fourth transistor is electrically connected to the second terminal of the driving transistor, and a second terminal of the fourth transistor is electrically connected to the first electrode of the light emitting device.

In some examples, the data writing circuit includes a fifth transistor; and a gate of the fifth transistor is electrically connected to a second scanning signal end of the $N^{th}$ row, and a first terminal of the fifth transistor is electrically connected to the data signal end loading the data signal.

In some examples, the driving circuit further includes a second control circuit, configured to conduct a first power end with the driving transistor in response to a second light emitting control signal of the $N^{th}$ row.

In some examples, the second control circuit includes a sixth transistor; and a gate of the sixth transistor is electrically connected to a second light emitting control signal end of the $N^{th}$ row loading the second light emitting control signal, a first terminal of the sixth transistor is electrically connected to the first power end, and a second terminal of the sixth transistor is electrically connected to the first terminal of the driving transistor.

In some examples, the driving circuit further includes a storage capacitor; and a first electrode plate of the storage capacitor is electrically connected to the gate of the driving transistor, and a second electrode plate of the storage capacitor is electrically connected to the first power end.

A driving circuit provided by an embodiment of the present disclosure includes a driving transistor, a first transistor to a sixth transistor, and a storage capacitor; a gate of the first transistor is electrically connected to a first scanning signal end of an $N^{th}$ row, a first terminal of the first transistor is electrically connected to an initialization signal end, and a second terminal of the first transistor is electrically connected to a first terminal of the second transistor; a gate of the second transistor is electrically connected to a first light emitting control signal end of the $N^{th}$ row, and a second terminal of the second transistor is electrically connected to a gate of the driving transistor; a gate of the third transistor is electrically connected to the first scanning signal end of the $N^{th}$ row, a first terminal of the third transistor is electrically connected to the gate of the driving transistor, and a second terminal of the third transistor is electrically connected to a second terminal of the driving transistor; a gate of the fourth transistor is electrically connected to the first light emitting control signal end of the $N^{th}$ row, a first terminal of the fourth transistor is electrically connected to the second terminal of the driving transistor, and a second terminal of the fourth transistor is electrically connected to a first electrode of a light emitting device; a gate of the fifth transistor is electrically connected to a second scanning signal end of the $N^{th}$ row, and a first terminal of the fifth transistor is electrically connected to a data signal end loading a data signal; a gate of the sixth transistor is electrically connected to a second light emitting control signal end of the $N^{th}$ row loading a second light emitting control signal, a first terminal of the sixth transistor is electrically connected to a first power end, and a second terminal of the sixth transistor is electrically connected to a first terminal of the driving transistor; and a first electrode plate of the storage capacitor is electrically connected to the gate of the driving transistor, and a second electrode plate of the storage capacitor is electrically connected to the first power end.

A display apparatus provided by an embodiment of the present disclosure includes the above driving circuit.

A driving circuit of a driving circuit provided by an embodiment of the present disclosure includes: at an initialization stage, controlling a level of a first scanning signal of an $N^{th}$ row to be a first level, a level of a second scanning signal of the $N^{th}$ row to be a second level, and a level of a first light emitting control signal of the $N^{th}$ row to be a first level, so that a first control circuit provides an initialization signal to a gate of a driving transistor and a first electrode of a light emitting device respectively; at a data writing stage, controlling the level of the first scanning signal of the $N^{th}$ row to be a first level, the level of the second scanning signal of the $N^{th}$ row to be a first level, and the level of the first light emitting control signal of the $N^{th}$ row to be a second level, so that a data writing circuit provides a data signal to the driving transistor; and at a light emitting stage, controlling the level of the first scanning signal of the $N^{th}$ row to be a second level, the level of the second scanning signal of the $N^{th}$ row to be a second level, and the level of the first light emitting control signal of the $N^{th}$ row to be a first level, so that the driving transistor generates a driving current according to the data signal, and the light emitting device emits light under control of the driving current.

In some examples, when the driving circuit further includes a second control circuit, the driving method further includes: at the initialization stage, controlling a level of a second light emitting control signal of the $N^{th}$ row to be a second level; at the data writing stage, controlling the level of the second light emitting control signal of the $N^{th}$ row to be a second level; and at the light emitting stage, controlling the level of the second light emitting control signal of the $N^{th}$ row to be a first level.

In some examples, after the data writing stage and before the light emitting stage, the driving method further includes: at a first buffer stage, controlling the level of the first scanning signal of the $N^{th}$ row to be a second level, the level of the second scanning signal of the $N^{th}$ row to be a first level, and the level of the first light emitting control signal of the $N^{th}$ row to be a second level.

In some examples, when the driving circuit further includes a second control circuit, the first buffer stage further includes controlling a level of a second light emitting control signal of the $N^{th}$ row to be a second level.

In some examples, after the first buffer stage and before the light emitting stage, the driving method further includes: at a second buffer stage, controlling the level of the first scanning signal of the $N^{th}$ row to be a second level, the level of the second scanning signal of the $N^{th}$ row to be a second level, and the level of the first light emitting control signal of the $N^{th}$ row to be a second level.

In some examples, when the driving circuit further includes a second control circuit, the second buffer stage further includes controlling a level of a second light emitting control signal of the $N^{th}$ row to be a first level.

DETAILED DESCRIPTION OF THE EMBODIMENTS

In order to make objectives, technical solutions and advantages of embodiments of the present disclosure clearer, the technical solutions of the embodiments of the present disclosure will be described below clearly and completely with reference to accompanying drawings of the embodiments of the present disclosure. Apparently, the described embodiments are part of the embodiments of the present disclosure, not all of them. The embodiments in the present disclosure and features in the embodiments may be mutually combined in the case of no conflict. On the basis of the described embodiments of the present disclosure, all other embodiments obtained by those ordinarily skilled in the art without inventive efforts fall within the scope of protection of the present disclosure.

Unless otherwise defined, technical or scientific terms used in the present disclosure shall have the usual meanings understood by those ordinarily skilled in the art to which the present disclosure pertains. "First", "second" and similar words used in the present disclosure do not indicate any order, quantity or importance, but are only used to distinguish different components. "Including" or "containing" and similar words mean that an element or item appearing before such words covers an element or item listed after the words and the equivalents thereof, and do not exclude other elements or items. "Connection" or "coupling" and similar words are not limited to physical or mechanical connection, but may include electrical connection, whether direct or indirect.

It should be noted that sizes and shapes of all graphs in the accompanying drawings do not reflect the true scale, and only intend to illustrate the content of the present disclosure. The same or similar reference numbers represent the same or similar elements or elements with the same or similar functions from beginning to end.

Figure 1:
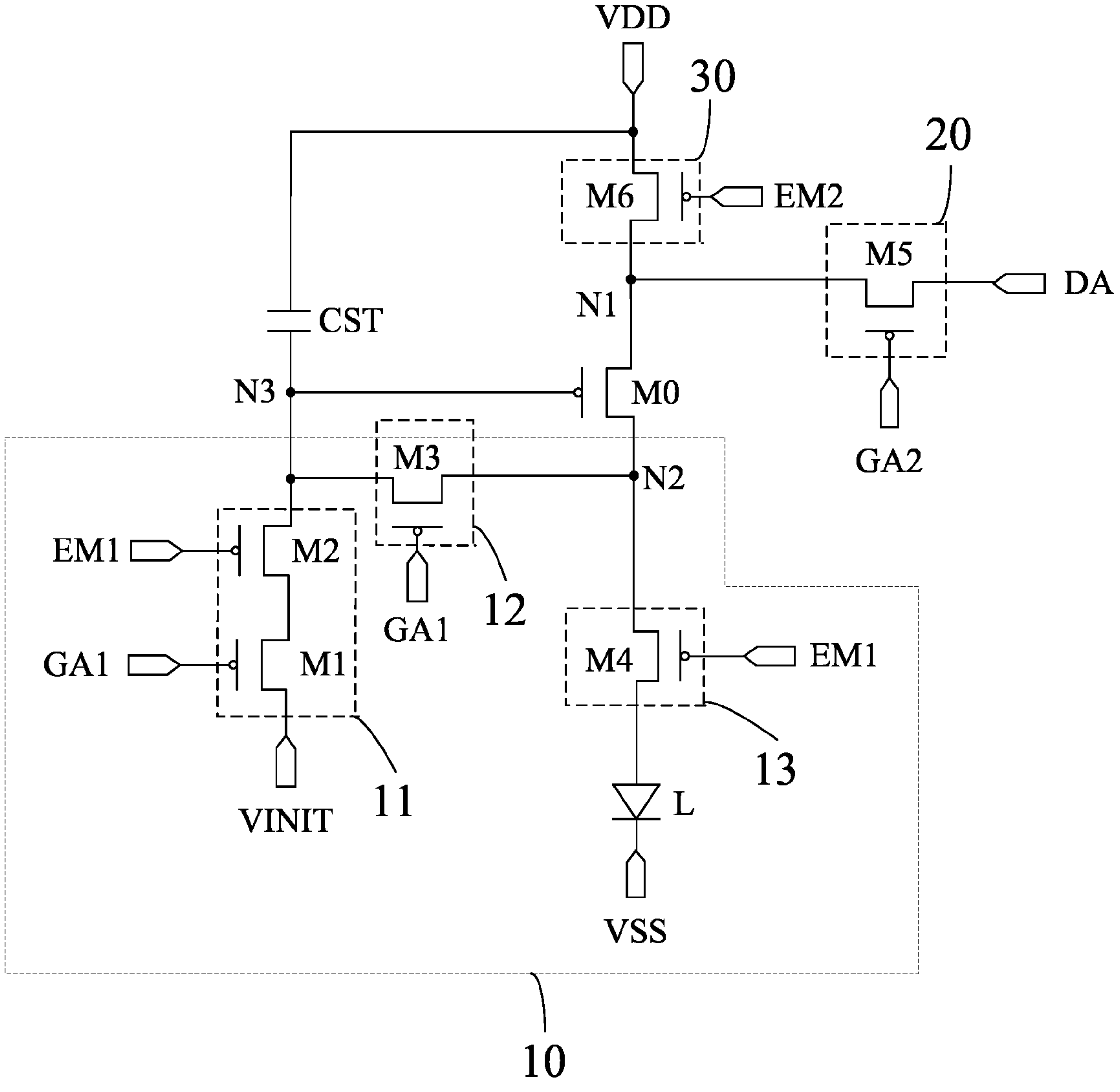
FIG. 1 is a schematic diagram of some specific structures of a driving circuit provided by an embodiment of the present disclosure.

A driving circuit provided by an embodiment of the present disclosure, as shown in FIG. 1, may include: a light emitting device L, configured to emit light under control of a driving current; a driving transistor M0, configured to generate the driving current according to a data signal; a first control circuit 10, configured to provide an initialization signal to a gate electrode of the driving transistor M0 and a first electrode of the light emitting device L respectively in response to a first scanning signal of an $N^{th}$ row and a first light emitting control signal of the $N^{th}$ row; and a data writing circuit 20, configured to provide the data signal to the driving transistor M0 in response to a second scanning signal of the $N^{th}$ row.

According to the above driving circuit provided by the embodiment of the present disclosure, by responding to the first scanning signal of the $N^{th}$ row and the first light emitting control signal of the $N^{th}$ row, the first control circuit 10 may provide the initialization signal to the gate of the driving transistor M0 and the first electrode of the light emitting device L respectively, so as to simultaneously initialize the gate of the driving transistor M0 and the first electrode of the light emitting device L. By responding to the second scanning signal of the $N^{th}$ row, the data writing circuit 20 may provide the data signal to the driving transistor M0, so that the driving transistor M0 may generate the driving current according to the data signal, thereby causing the light emitting device L to emit the light under the control of the driving current.

In some examples, during specific implementation, as shown in FIG. 1, the first control circuit 10 may include: a first sub control circuit 11, a second sub control circuit 12, and a third sub control circuit 13.

The first sub control circuit 11 is electrically connected to a first scanning signal end GA1 of the $N^{th}$ row, a first light emitting control signal end EM1 of the $N^{th}$ row, an initialization signal end, and the gate of the driving transistor M0 respectively, and configured to provide the initialization signal loaded at the initialization signal end to the gate of the driving transistor M0 in response to the first scanning signal at the first scanning signal end GA1 of the $N^{th}$ row and the first light emitting control signal at the first light emitting control signal end EM1 of the $N^{th}$ row.

The second sub control circuit 12 is electrically connected to the first scanning signal end GA1 of the $N^{th}$ row, and the gate and a second terminal of the driving transistor M0 respectively, and configured to conduct the gate with the second terminal of the driving transistor M0 in response to the first scanning signal at the first scanning signal end GA1 of the $N^{th}$ row.

The third sub control circuit 13 is electrically connected to the first light emitting control signal end EM1 of the $N^{th}$ row, the second terminal of the driving transistor M0, and the first electrode of the light emitting device L respectively, and configured to conduct the second terminal of the driving transistor M0 with the first electrode of the light emitting device L in response to the first light emitting control signal at the first light emitting control signal end EM1 of the $N^{th}$ row.

Exemplarily, the first sub control circuit 11, in response to the first scanning signal at the first scanning signal end GA1 of the $N^{th}$ row and the first light emitting control signal at the first light emitting control signal end EM1 of the $N^{th}$ row, may provide the initialization signal loaded at the initialization signal end to the gate of the driving transistor M0, so as to initialize the gate of the driving transistor M0. Moreover, the second sub control circuit 12, in response to the first scanning signal at the first scanning signal end GA1 of the $N^{th}$ row, conducts the gate of the driving transistor M0 with the second terminal of the driving transistor M0. In response to the first light emitting control signal of the first light emitting control signal end EM1 of the $N^{th}$ row, the third sub control circuit 13 conducts the second terminal of the driving transistor M0 with the first electrode of the light emitting device L, so as to input the initialization signal input to the gate of the driving transistor M0 to the first electrode of the light emitting device L through the second sub control circuit 12 and the third sub control circuit 13, thereby simultaneously initializing the first electrode of the light emitting device L.

During specific implementation, in the embodiment of the present disclosure, as shown in FIG. 1, the driving circuit may further include a second control circuit 30, configured to conduct a first power end VDD with the driving transistor M0 in response to a second light emitting control signal of the $N^{th}$ row.

During specific implementation, in the embodiment of the present disclosure, the first electrode of the light emitting device L is electrically connected to the third sub control circuit 13, and a second electrode of the light emitting device L is electrically connected to a second power end VSS. The first electrode of the light emitting device L may be its positive electrode, and the second electrode of the light emitting device L may be its negative electrode. Exemplarily, the light emitting device L may be set as an electroluminescent diode, for example, the light emitting device L may include at least one of a micro light emitting diode (Micro LED), an organic light emitting diode (OLED), or quantum dot light emitting diodes (QLED). In addition, the general light emitting device L has a light emitting threshold voltage, and emits light when voltage at both ends of the light emitting device L is greater than or equal to the light emitting threshold voltage. In practical applications, a specific structure of the light emitting device L may be designed and determined according to a practical application environment, which is not limited here.

During specific implementation, in the embodiment of the present disclosure, as shown in FIG. 1, the first sub control circuit 11 may include a first transistor M1 and a second transistor M2.

A gate of the first transistor M1 is electrically connected to the first scanning signal end GA1 of the $N^{th}$ row, a first terminal of the first transistor M1 is electrically connected to the initialization signal end, and a second terminal of the first transistor M1 is electrically connected to a first terminal of the second transistor M2.

A gate of the second transistor M2 is electrically connected to a first light emitting control signal end EM1 of the $N^{th}$ row, and a second terminal of the second transistor M2 is electrically connected to a gate of the driving transistor M0.

During specific implementation, in the embodiment of the present disclosure, as shown in FIG. 1, the second sub control circuit 12 may include a third transistor M3.

A gate of the third transistor M3 is electrically connected to the first scanning signal end GA1 of the $N^{th}$ row, a first terminal of the third transistor M3 is electrically connected to the gate of the driving transistor M0, and a second terminal of the third transistor M3 is electrically connected to the second terminal of the driving transistor M0.

During specific implementation, in the embodiment of the present disclosure, as shown in FIG. 1, the third sub control circuit 13 may include a fourth transistor M4.

A gate of the fourth transistor M4 is electrically connected to the first light emitting control signal end EM1 of the $N^{th}$ row, a first terminal of the fourth transistor M4 is electrically connected to the second terminal of the driving transistor M0, and a second terminal of the fourth transistor M4 is electrically connected to the first electrode of the light emitting device L.

During specific implementation, in the embodiment of the present disclosure, as shown in FIG. 1, the data writing circuit 20 may include a fifth transistor M5.

A gate of the fifth transistor M5 is electrically connected to a second scanning signal end GA2 of the $N^{th}$ row, and a first terminal of the fifth transistor M5 is electrically connected to the data signal end DA loading the data signal.

During specific implementation, in the embodiment of the present disclosure, as shown in FIG. 1, the second control circuit 30 may include a sixth transistor M6.

A gate of the sixth transistor M6 is electrically connected to a second light emitting control signal end EM2 of the $N^{th}$ row loading the second light emitting control signal, a first terminal of the sixth transistor M6 is electrically connected to a first power end VDD, and a second terminal of the sixth transistor M6 is electrically connected to a first terminal of the driving transistor M0.

During specific implementation, in the embodiment of the present disclosure, as shown in FIG. 1, the driving circuit may further include a storage capacitor CST.

A first electrode plate of the storage capacitor CST is electrically connected to the gate of the driving transistor M0, and a second electrode plate of the storage capacitor CST is electrically connected to the first power end VDD.

During specific implementation, in the embodiment of the present disclosure, as shown in FIG. 1, the driving transistor M0 may be a P-type transistor. The first terminal of the driving transistor M0 is its source, the second terminal of the driving transistor M0 is its drain, and when the driving transistor M0 is in a saturated state, the current flows from the source of the driving transistor M0 to its drain.

Certainly, during specific implementation, in the embodiment of the present disclosure, the driving transistor M0 may also be an N-type transistor. The first terminal of the driving transistor M0 is its drain, the second terminal of the driving transistor M0 is its source, and when the driving transistor M0 is in the saturated state, the current flows from the drain of the driving transistor M0 to its source.

The above is only an example to illustrate a specific structure of each circuit in the driving circuit provided by the embodiment of the present disclosure. During specific implementation, the specific structure of the above circuit is not limited to the above structure provided by the embodiment of the present disclosure, but may also be other structures known to those skilled in the art, which all fall within the scope of protection of the present disclosure and will not be specifically limited here.

Optionally, in order to reduce a preparation process, during specific implementation, in the embodiment of the present disclosure, as shown in FIG. 1, the first transistor M1 to the sixth transistor M6 may all be P-type transistors. Certainly, the first transistor M1 to the sixth transistor M6 may also all be N-type transistors, which may also be designed and determined according to the actual application environment and is not limited here.

Further, during specific implementation, in the embodiment of the present disclosure, the P-type transistor is turned off under an action of a high-level signal and is turned on under an action of a low-level signal. The N-type transistor is turned on under the action of the high-level signal and is turned off under the action of the low-level signal.

It should be noted that the transistors mentioned in the above embodiment of the present disclosure may be either a thin film transistor (TFT) or a metal oxide semiconductor (MOS) field effect transistor, which are be limited here.

During specific implementation, the first terminal of the transistor may be used as its source and the second terminal as its drain according to a type of the transistor and a signal of its gate; alternatively, on the contrary, the first terminal of the transistor is used as its drain and the second terminal as its source, which may be designed and determined according to the actual application environment, and are not specifically distinguished here.

During specific implementation, in the embodiment of the present disclosure, a voltage Vdd of the first power end is generally a positive value, and a voltage Vss of the second power end is generally grounded or a negative value. In practical applications, specifically numerical values of the voltage Vdd of the first power end and the voltage Vss of the second power end may be designed and determined according to the practical application environment, which are not limited here.

During specific implementation, in the embodiment of the present disclosure, a voltage Vinit of the initialization signal and the voltage Vss of the second power end may meet the following formula: $Vinit-Vss<VL$. VL represents a light emitting threshold voltage of the light emitting device L.

Figure 5:
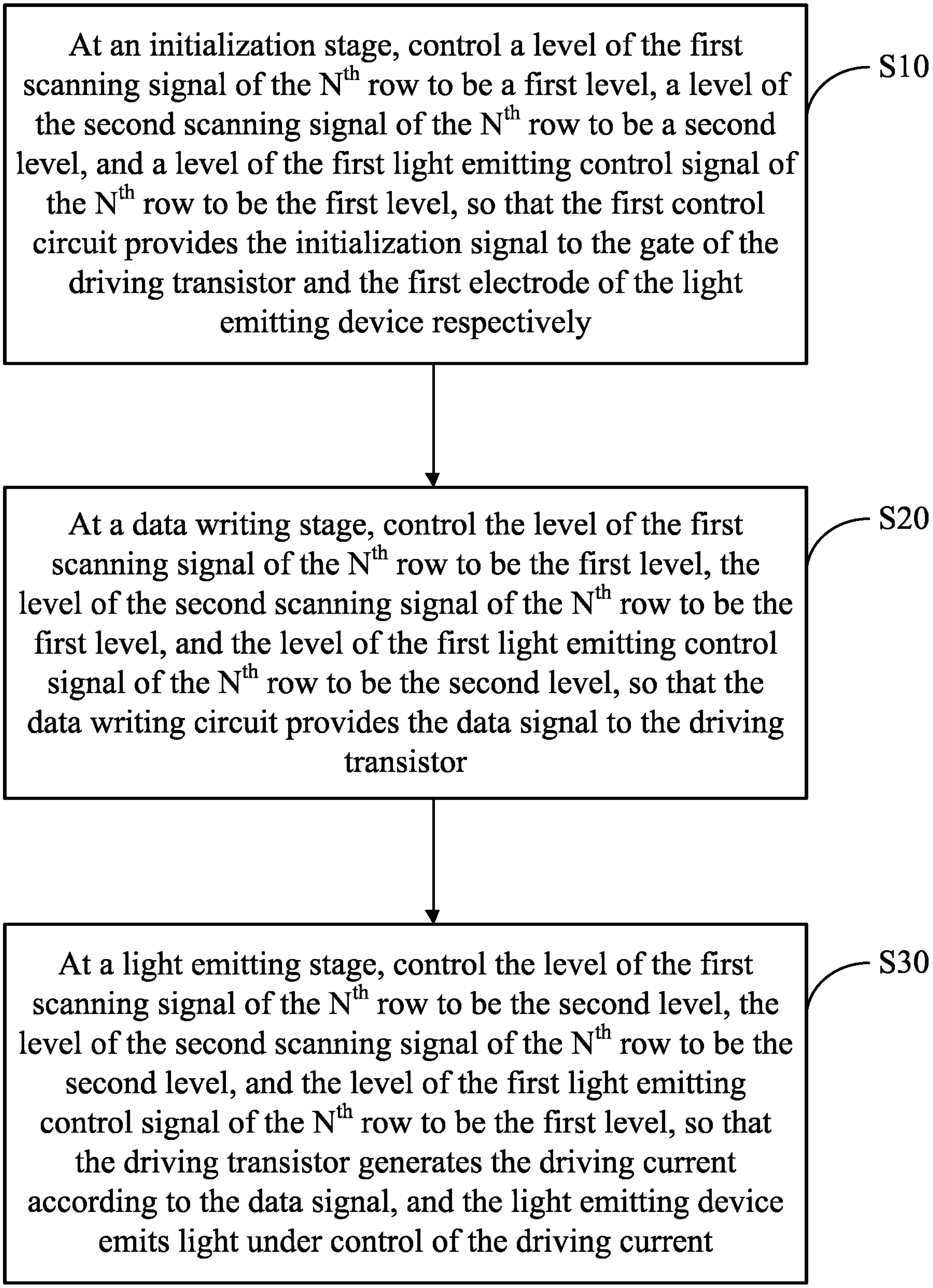
FIG. 5 is a flow diagram of a driving method provided by an embodiment of the present disclosure.

An embodiment of the present disclosure further provides a driving method of the above driving circuit. As shown in FIG. 5, the driving method may include the following steps: S10, at an initialization stage, a level of the first scanning signal of the $N^{th}$ row is controlled to be a first level, a level of the second scanning signal of the $N^{th}$ row is controlled to be a second level, and a level of the first light emitting control signal of the $N^{th}$ row is controlled to be the first level, so that the first control circuit provides the initialization signal to the gate of the driving transistor and the first electrode of the light emitting device respectively; S20, at a data writing stage, the level of the first scanning signal of the $N^{th}$ row is controlled to be the first level, the level of the second scanning signal of the $N^{th}$ row is controlled to be the first level, and the level of the first light emitting control signal of the $N^{th}$ row is controlled to be the second level, so that the data writing circuit provides the data signal to the driving transistor; and S30, at a light emitting stage, the level of the first scanning signal of the $N^{th}$ row is controlled to be the second level, the level of the second scanning signal of the $N^{th}$ row is controlled to be the second level, and the level of the first light emitting control signal of the $N^{th}$ row is controlled to be the first level, so that the driving transistor generates the driving current according to the data signal, and the light emitting device emits light under control of the driving current.

According to the above driving method provided by the embodiment of the present disclosure, at the initialization stage, the first control circuit, in response to the first scanning signal of the $N^{th}$ row and the first light emitting control signal of the $N^{th}$ row, may provide the initialization signal to the gate of the driving transistor and the first electrode of the light emitting device respectively, so as to simultaneously initialize the gate of the driving transistor and the first electrode of the light emitting device. At the data writing stage, the data writing circuit, in response to the second scanning signal of the $N^{th}$ row, may provide the data signal to the driving transistor, so that the driving transistor may generate the driving current at the light emitting stage according to the data signal, thereby causing the light emitting device to emit the light under the control of the driving current.

During specific implementation, in the embodiment of the present disclosure, when the driving circuit further includes a second control circuit 30, the driving method may further include at the initialization stage, a level of a second light emitting control signal of the $N^{th}$ row is controlled to be the second level; at the data writing stage, the level of the second light emitting control signal of the $N^{th}$ row is controlled to be the second level; and at the light emitting stage, the level of the second light emitting control signal of the $N^{th}$ row is controlled to be the first level.

Figure 2:
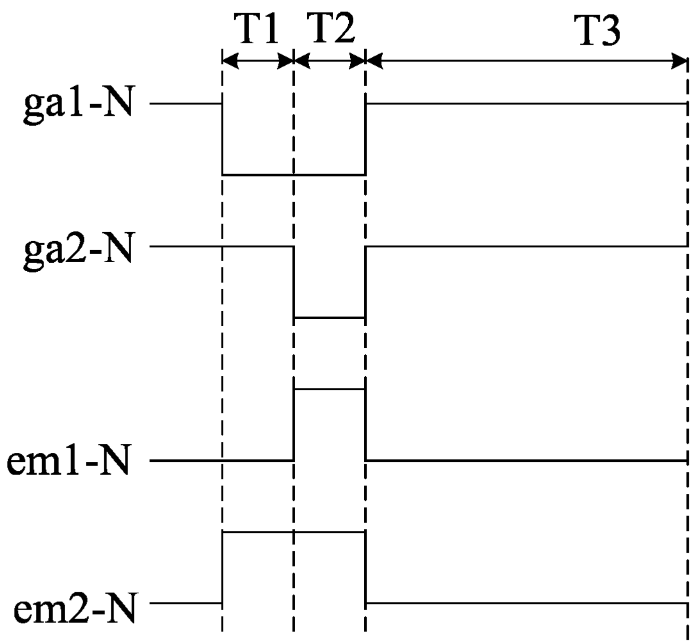
FIG. 2 is a schematic diagram of some circuit timings of a driving circuit provided by an embodiment of the present disclosure.

A working process of the above driving circuit provided by the embodiment of the present disclosure is described below by taking the driving circuit shown in FIG. 1 as an example, and with reference to a circuit timing diagram shown in FIG. 2. As shown in FIG. 2, ga1-N represents the first scanning signal of the $N^{th}$ row, ga2-N represents the second scanning signal of the $N^{th}$ row, em1-N represents the first light emitting control signal of the $N^{th}$ row, and em2-N represents the second light emitting control signal of the $N^{th}$ row. Moreover, the working process of one driving circuit in one display frame may include the initialization stage T1, the data writing stage T2, and the light emitting stage T3.

At the initialization stage T1, the first transistor M1 is turned on under the control of the low level of the signal ga1-N, and the second transistor M2 is also turned on under the control of the low level of the signal em1-N, such that the initialization signal at an initialization signal end VINIT may be provided to the gate N3 of the driving transistor M0 through the first transistor M1 and second transistor M2 which are turned on, the voltage of the gate N3 of the driving transistor M0 is Vinit, and then the gate N3 of the driving transistor M0 is initialized. Moreover, the third transistor M3 is turned on under the control of the low level of the signal ga1-N, and the fourth transistor M4 is also turned on under the low level of the signal em1-N, such that the initialization signal at the initialization signal end VINIT may be provided to the first electrode of the light emitting device L through the third transistor M3 and the fourth transistor M4 which are turned on, so as to initialize the first electrode of the light emitting device L. The sixth transistor M6 is turned off under the control of a high level of the signal em2-N. The fifth transistor M5 is turned off under the control of a high level of the signal ga2-N.

At the data writing stage T2, the fifth transistor M5 is turned on under the control of the low level of the signal ga2-N to provide the data signal at the data signal end DA to the first terminal N1 of the driving transistor M0, so that a voltage of the first terminal N1 of the driving transistor M0 is the voltage Vda of the data signal. Moreover, the third transistor M3 is turned on under the control of the low level of the signal ga1-N, so that the driving transistor M0 may form a diode connection mode, and the voltage Vda of the first terminal N1 of the driving transistor M0 charges the gate N3 of the driving transistor M0 and is stored through a storage capacitor CST. The second transistor M2 and the fourth transistor M4 are turned off under the control of the high level of the signal em1-N, and the sixth transistor M6 is turned off under the control of the high level of the signal em2-N.

At the light emitting stage T3, the sixth transistor M6 is turned on under the control of the low level of the signal em2-N, the turned-on sixth transistor M6 may provide the voltage Vdd at the first power end VDD to the first terminal N1 of the driving transistor M0, so that the voltage of the first terminal N1 of the driving transistor M0 is Vdd. In this way, the driving transistor M0 may be made in a saturated state, so that the driving transistor M0 generates the driving current Ids: $Ids=K(Vda-Vdd)^2$. Moreover, the fourth transistor M4 is turned on under the control of the low level of the signal em1-N, and the turned-on fourth transistor M4 may conduct the second terminal N2 of the driving transistor M0 with the first electrode of the light emitting device L, so that the driving current Ids flows into the light emitting device L to drive the light emitting device L to emit light. K is a structural constant related to process and design. Moreover, the first transistor M1 and the third transistor M3 are turned off under the control of the high level of the signal ga1-N. The fifth transistor M5 is turned off under the control of the high level of the signal ga2-N.

In some other examples, in the embodiment of the present disclosure, the driving method may further include a first buffering stage after the data writing stage and before the light emitting stage. At the first buffer stage, the level of the first scanning signal of the $N^{th}$ row is controlled to be the second level, the level of the second scanning signal of the $N^{th}$ row is controlled to be the first level, and the level of the first light emitting control signal of the $N^{th}$ row is controlled to be the second level.

Moreover, in the embodiment of the present disclosure, when the driving circuit further includes a second control circuit 30, the driving method may further include: at the first buffer stage, a level of the second light emitting control signal of the $N^{th}$ row is controlled to be the second level.

Figure 3:
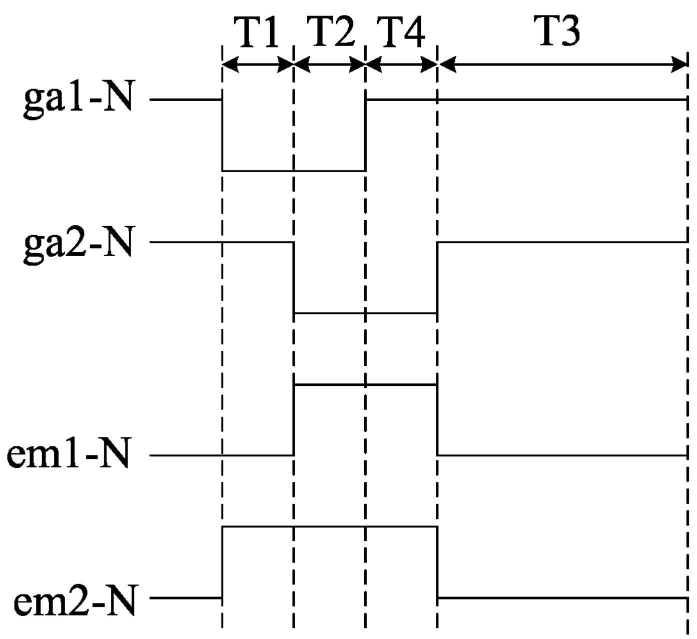
FIG. 3 is a schematic diagram of some circuit timings of a driving circuit provided by an embodiment of the present disclosure.

A working process of the above driving circuit provided by the embodiment of the present disclosure is described below by taking the driving circuit shown in FIG. 1 as an example, and with reference to a circuit timing diagram shown in FIG. 3. As shown in FIG. 3, ga1-N represents the first scanning signal of the $N^{th}$ row, ga2-N represents the second scanning signal of the $N^{th}$ row, em1-N represents the first light emitting control signal of the $N^{th}$ row, and em2-N represents the second light emitting control signal of the $N^{th}$ row. Moreover, the working process of one driving circuit in one display frame may include the initialization stage T1, the data writing stage T2, the first buffer stage T4 and the light emitting stage T3.

At the initialization stage T1, the first transistor M1 is turned on under the control of the low level of the signal ga1-N, and the second transistor M2 is also turned on under the control of the low level of the signal em1-N, such that the initialization signal at the initialization signal end VINIT may be provided to the gate N3 of the driving transistor M0 through the first transistor M1 and second transistor M2 which are turned on, the voltage of the gate N3 of the driving transistor M0 is Vinit, and then the gate N3 of the driving transistor M0 is initialized. Moreover, the third transistor M3 is turned on under the control of the low level of the signal ga1-N, and the fourth transistor M4 is also turned on under the low level of the signal em1-N, such that the initialization signal at the initialization signal end VINIT may be provided to the first electrode of the light emitting device L through the third transistor M3 and the fourth transistor M4 which are turned on, so as to initialize the first electrode of the light emitting device L. The sixth transistor M6 is turned off under the control of the high level of the signal em2-N. The fifth transistor M5 is turned off under the control of the high level of the signal ga2-N.

At the data writing stage T2, the fifth transistor M5 is turned on under the control of the low level of the signal ga2-N to provide the data signal at the data signal end DA to the first terminal N1 of the driving transistor M0, so that the voltage of the first terminal N1 of the driving transistor M0 is the voltage Vda of the data signal. Moreover, the third transistor M3 is turned on under the control of the low level of the signal ga1-N, so that the driving transistor M0 may form the diode connection mode, and the voltage Vda of the first terminal N1 of the driving transistor M0 charges the gate N3 of the driving transistor M0 and is stored through the storage capacitor CST. The second transistor M2 and the fourth transistor M4 are turned off under the control of the high level of the signal em1-N, and the sixth transistor M6 is turned off under the control of the high level of the signal em2-N.

At the first buffer stage T4, the fifth transistor M5 is turned on under the control of the low level of the signal ga2-N to provide the data signal at the data signal end DA to the first terminal N1 of the driving transistor M0, so that the voltage of the first terminal N1 of the driving transistor M0 is continued to be the voltage Vda of the data signal. Moreover, the first transistor M1 and the third transistor M3 are turned off under the control of the high level of the signal ga1-N. The second transistor M2 and the fourth transistor M4 are turned off under the control of the high level of the signal em1-N. The sixth transistor M6 is turned off under the control of the high level of the signal em2-N.

At the light emitting stage T3, the sixth transistor M6 is turned on under the control of the low level of the signal em2-N, the turned-on sixth transistor M6 may provide the voltage Vdd at the first power end VDD to the first terminal N1 of the driving transistor M0, so that the voltage of the first terminal N1 of the driving transistor M0 is Vdd. In this way, the driving transistor M0 may be made in the saturated state, so that the driving transistor M0 generates the driving current Ids: $Ids=K(Vda-Vdd)^2$. Moreover, the fourth transistor M4 is turned on under the control of the low level of the signal em1-N, and the turned-on fourth transistor M4 may conduct the second terminal N2 of the driving transistor M0 with the first electrode of the light emitting device L, so that the driving current Ids flows into the light emitting device L to drive the light emitting device L to emit light. K is a structural constant related to process and design. Moreover, the first transistor M1 and the third transistor M3 are turned off under the control of the high level of the signal ga1-N. The fifth transistor M5 is turned off under the control of the high level of the signal ga2-N.

In some other examples, in the embodiment of the present disclosure, the driving method further includes a second buffering stage after the first buffer stage and before the light emitting stage. At the second buffer stage, the level of the first scanning signal of the $N^{th}$ row is controlled to be the second level, the level of the second scanning signal of the $N^{th}$ row is controlled to be the second level, and the level of the first light emitting control signal of the $N^{th}$ row is controlled to be the second level.

Moreover, in the embodiment of the present disclosure, when the driving circuit further includes the second control circuit 30, the driving method further includes: at the second buffer stage, a level of the second light emitting control signal of the $N^{th}$ row is controlled to be the first level.

Figure 4:
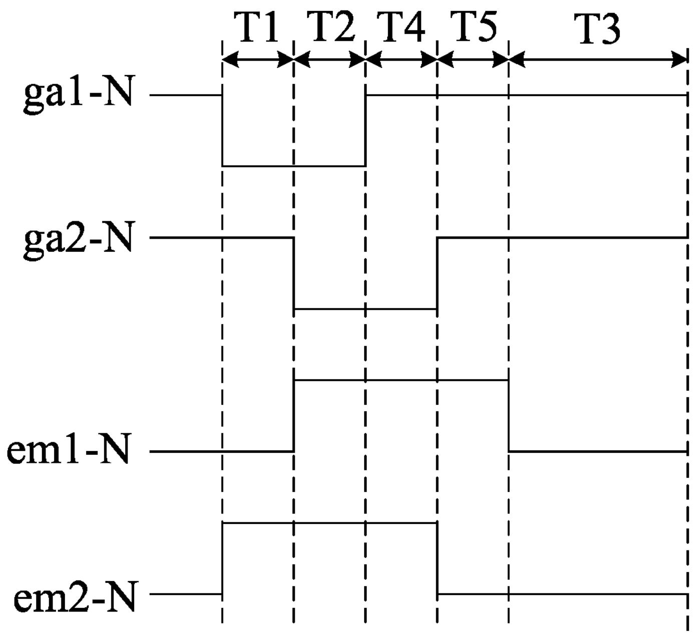
FIG. 4 is a schematic diagram of some circuit timings of a driving circuit provided by an embodiment of the present disclosure.

The working process of the above driving circuit provided by the embodiment of the present disclosure is described below by taking the driving circuit shown in FIG. 1 as an example, and with reference to a circuit timing diagram shown in FIG. 4. As shown in FIG. 4, ga1-N represents the first scanning signal of the $N^{th}$ row, ga2-N represents the second scanning signal of the $N^{th}$ row, em1-N represents the first light emitting control signal of the $N^{th}$ row, and em2-N represents the second light emitting control signal of the $N^{th}$ row. Moreover, the working process of one driving circuit in one display frame may include the initialization stage T1, the data writing stage T2, the first buffer stage T4, the second buffer stage T5 and the light emitting stage T3.

At the initialization stage T1, the first transistor M1 is turned on under the control of the low level of the signal ga1-N, and the second transistor M2 is also turned on under the control of the low level of the signal em1-N, such that the initialization signal at the initialization signal end VINIT may be provided to the gate N3 of the driving transistor M0 through the first transistor M1 and second transistor M2 which are turned on, the voltage of the gate N3 of the driving transistor M0 is Vinit, and then the gate N3 of the driving transistor M0 is initialized. Moreover, the third transistor M3 is turned on under the control of the low level of the signal ga1-N, and the fourth transistor M4 is also turned on under the low level of the signal em1-N, such that the initialization signal at the initialization signal end VINIT may be provided to the first electrode of the light emitting device L through the third transistor M3 and the fourth transistor M4 which are turned on, so as to initialize the first electrode of the light emitting device L. The sixth transistor M6 is turned off under the control of the high level of the signal em2-N. The fifth transistor M5 is turned off under the control of the high level of the signal ga2-N.

At the data writing stage T2, the fifth transistor M5 is turned on under the control of the low level of the signal ga2-N to provide the data signal at the data signal end DA to the first terminal N1 of the driving transistor M0, so that the voltage of the first terminal N1 of the driving transistor M0 is the voltage Vda of the data signal. Moreover, the third transistor M3 is turned on under the control of the low level of the signal ga1-N, so that the driving transistor M0 may form the diode connection mode, and the voltage Vda of the first terminal N1 of the driving transistor M0 charges the gate N3 of the driving transistor M0 and is stored through the storage capacitor CST. The second transistor M2 and the fourth transistor M4 are turned off under the control of the high level of the signal em1-N, and the sixth transistor M6 is turned off under the control of the high level of the signal em2-N.

At the first buffer stage T4, the fifth transistor M5 is turned on under the control of the low level of the signal ga2-N to provide the data signal at the data signal end DA to the first terminal N1 of the driving transistor M0, so that the voltage of the first terminal N1 of the driving transistor M0 is continued to be the voltage Vda of the data signal. Moreover, the first transistor M1 and the third transistor M3 are turned off under the control of the high level of the signal ga1-N. The second transistor M2 and the fourth transistor M4 are turned off under the control of the high level of the signal em1-N. The sixth transistor M6 is turned off under the control of the high level of the signal em2-N.

At the second buffer stage T5, the sixth transistor M6 is turned on under the control of the high level of the signal em2-N. The turned-on sixth transistor M6 may provide the voltage Vdd at the first power end VDD to the first terminal N1 of the driving transistor M0, so that the voltage of the first terminal N1 of the driving transistor M0 is Vdd. In this way, the first terminal N1 of the driving transistor M0 may be pre-charged through the first power end VDD. Moreover, the first transistor M1 and the third transistor M3 are turned off under the control of the high level of the signal ga1-N. The second transistor M2 and the fourth transistor M4 are turned off under the control of the high level of the signal em1-N. The fifth transistor M5 is turned off under the control of the high level of the signal ga2-N.

At the light emitting stage T3, the sixth transistor M6 is turned on under the control of the low level of the signal em2-N, the turned-on sixth transistor M6 may provide the voltage Vdd at the first power end VDD to the first terminal N1 of the driving transistor M0, so that the voltage of the first terminal N1 of the driving transistor M0 is Vdd. In this way, the driving transistor M0 may be made in the saturated state, so that the driving transistor M0 generates the driving current Ids: $Ids=K(Vda-Vdd)^2$. Moreover, the fourth transistor M4 is turned on under the control of the low level of the signal em1-N, and the turned-on fourth transistor M4 may conduct the second terminal N2 of the driving transistor M0 with the first electrode of the light emitting device L, so that the driving current Ids flows into the light emitting device L to drive the light emitting device L to emit light. K is a structural constant related to process and design. Moreover, the first transistor M1 and the third transistor M3 are turned off under the control of the high level of the signal ga1-N. The fifth transistor M5 is turned off under the control of the high level of the signal ga2-N.

It should be noted that by making the second scanning signal ga2-N of the $N^{th}$ row be the low level at the first buffer stage T4, the fifth transistor M5 may continue to be turned on to make charging more sufficient.

It should be noted that by making the first light emitting control signal em1-N of the $N^{th}$ row be the high level in the second buffer stage T5, the fourth transistor M4 may be controlled to turned off, which may make the voltage of the gate of the driving transistor be further stabilized, that is, make the current generated by the driving transistor be further stabilized, and then be provided to the light emitting device, thereby further improving light emitting stability of the light emitting device.

It should be noted that by setting the first buffer stage T4 and the second buffer stage T5, a gate driving circuit in the related art may be used to provide a signal to the first scanning signal line and the second scanning signal line, as well as the light emitting control circuit in the related art may be used to provide a signal to the first light emitting control signal line and the second light emitting control signal line. Certainly, it is also possible to not set the first buffer stage T4 and the second buffer stage T5. In this way, by redesigning a structure of the gate driving circuit and the light emitting control circuit, the gate driving circuit and the light emitting control circuit may meet the signal timing shown in FIG. 2.

Based on the same inventive concept, an embodiment of the present disclosure further provides a display apparatus, including the above driving circuit provided by the embodiment of the present disclosure. Principles of the display apparatus for solving the problems are similar to that of the aforementioned driving circuit, therefore, implementation of the display apparatus may refer to that of the aforementioned driving circuit, and repetitions are omitted.

During specific implementation, in the embodiment of the present disclosure, the display apparatus may include a display area, the display area includes Q rows of signal line groups and Y columns of data lines, and the Q rows of signal line groups and the Y columns of data lines intersect. Each row of signal line group includes a first scanning signal line, a second scanning signal line, a first light emitting control signal line, and a second light emitting control signal line. The Q rows of signal line groups are arranged in sequence in an extension direction of the data lines.

Exemplarily, $1 \le N \le Q$ may be made, and N, Q, and Y are all integers. For example, a first scanning signal line in the $N^{th}$ row of signal line group may be the first scanning signal line of the $N^{th}$ row, and a first scanning signal of the $N^{th}$ row is a signal transmitted on the first scanning signal line of the $N^{th}$ row, that is, a first scanning signal end of the $N^{th}$ row is electrically connected to the first scanning signal line of the $N^{th}$ row.

A second scanning signal line in the $N^{th}$ row of signal line group may be the second scanning signal line of the $N^{th}$ row, and a second scanning signal of the $N^{th}$ row is a signal transmitted on the second scanning signal line of the $N^{th}$ row, that is, a second scanning signal end of the $N^{th}$ row is electrically connected to the second scanning signal line of the $N^{th}$ row.

A first light emitting control signal line in the $N^{th}$ row of signal line group may be the first light emitting control signal line of the $N^{th}$ row, and a first light emitting control signal of the $N^{th}$ row is a signal transmitted on the first light emitting control signal line of the $N^{th}$ row, that is, a first light emitting control signal end of the $N^{th}$ row is electrically connected to the first light emitting control signal line of the $N^{th}$ row.

A second light emitting control signal line in the $N^{th}$ row of signal line group may be the second light emitting control signal line of the $N^{th}$ row, and a second light emitting control signal of the $N^{th}$ row is a signal transmitted on the second light emitting control signal line of the $N^{th}$ row, that is, a second light emitting control signal end of the $N^{th}$ row is electrically connected to the second light emitting control signal line of the $N^{th}$ row.

Moreover, the data lines are used to transmit data signals. Data signal ends are electrically connected to the data lines so as to load the data signals at the data signal ends.

For example, the display area may also include Q rows and Y columns of driving circuits. Moreover, one row of driving circuit may correspond to one row of signal line group. That is, one row of driving circuit corresponds to one first scanning signal line, one second scanning signal line, one first light emitting control signal line, and one second light emitting control signal line. The first scanning signal end of the driving circuit of the $N^{th}$ row is electrically connected to the first scanning signal line of the $N^{th}$ row. The second scanning signal end of the driving circuit of the $N^{th}$ row is electrically connected to the second scanning signal line of the $N^{th}$ row. The first light emitting control signal end of the driving circuit of the $N^{th}$ row is electrically connected to the first light emitting control signal line of the $N^{th}$ row. The second light emitting control signal end of the driving circuit of the $N^{th}$ row is electrically connected to the second light emitting control signal line of the $N^{th}$ row.

In this way, the first scanning signal line of the current row may be made to provide the first scanning signal to the driving circuit of the current row, so that the first scanning signal of the $N^{th}$ row and a first scanning signal of the $(N-1)^{th}$ row or $(N+1)^{th}$ row are transmitted through the signal lines independent of each other, thereby reducing delay and interference of the first scanning signal.

Moreover, in this way, the second scanning signal line of the current row may be made to provide the second scanning signal to the driving circuit of the current row, so that the second scanning signal of the $N^{th}$ row and a second scanning signal of the $(N-1)^{th}$ row or $(N+1)^{th}$ row are transmitted through the signal lines independent of each other, thereby reducing delay and interference of the second scanning signal.

Moreover, in this way, the first light emitting control signal line of the current row may be made to provide the first light emitting control signal to the driving circuit of the current row, so that the first light emitting control signal of the $N^{th}$ row and a first light emitting control signal of the $(N-1)^{th}$ row or $(N+1)^{th}$ row are transmitted through the signal lines independent of each other, thereby reducing delay and interference of the first light emitting control signal.

Moreover, in this way, the second light emitting control signal line of the current row may be made to provide the second light emitting control signal to the driving circuit of the current row, so that the second light emitting control signal of the $N^{th}$ row and a second light emitting control signal of the $(N-1)^{th}$ row or $(N+1)^{th}$ row are transmitted through the signal lines independent of each other, thereby reducing delay and interference of the second light emitting control signal.

For example, the display area includes a plurality of pixel units arranged in an array. Each pixel unit includes a plurality of sub pixels. Exemplarily, pixel units may include red sub pixels, green sub pixels and blue sub pixels, so that color mixing may be performed through red, green and blue so as to achieve color display. Alternatively, the pixel units may also include red sub pixels, green sub pixels, blue sub pixels and white sub pixels, so that color mixing may be performed through red, green, blue and white so as to achieve color display. Certainly, in practical applications, light emitting color of the sub pixels in the pixel units may be designed and determined according to the practical application environment, which is not limited here.

During specific implementation, in the embodiment of the present disclosure, each sub pixel may include the above driving circuit, so that the sub pixels may achieve light emitting display.

During specific implementation, in the embodiment of the present disclosure, one column of sub pixels may correspond to one data line, and the data signal end of the driving circuit in this column is electrically connected to the corresponding data line. One row of sub pixels may correspond to one row of signal line groups, and then one row of sub pixel may correspond to one first scanning signal line, one second scanning signal line, one first light emitting control signal line, and one second light emitting control signal line. That is to say, the first scanning signal ends GA1 of the driving circuits in the first row of sub pixels are electrically connected to the first scanning signal line in the first row, the second scanning signal ends GA2 of the driving circuits in the first row of sub pixels are electrically connected to the second scanning signal line in the first row, the first light emitting control signal ends EM1 of the driving circuits in the first row of sub pixels are electrically connected to the first light emitting control signal line in the first row, and the second light emitting control signal ends EM2 of the driving circuits in the first row of sub pixels are electrically connected to the second light emitting control signal line in the first row.

The first scanning signal ends GA1 of the driving circuits in the second row of sub pixels are electrically connected to the first scanning signal line in the second row, the second scanning signal ends GA2 of the driving circuits in the second row of sub pixels are electrically connected to the second scanning signal line in the second row, the first light emitting control signal ends EM1 of the driving circuits in the second row of sub pixels are electrically connected to the first light emitting control signal line in the second row, and the second light emitting control signal ends EM2 of the driving circuits in the second row of sub pixels are electrically connected to the second light emitting control signal line in the second row.

The same applies to the rest, and so on. The first scanning signal ends GA1 of the driving circuits in the $Q^{th}$ row of sub pixels are electrically connected to the first scanning signal line in the $Q^{th}$ row, the second scanning signal ends GA2 of the driving circuits in the $Q^{th}$ row of sub pixels are electrically connected to the second scanning signal line in the $Q^{th}$ row, the first light emitting control signal ends EM1 of the driving circuits in the $Q^{th}$ row of sub pixels are electrically connected to the first light emitting control signal line in the $Q^{th}$ row, and the second light emitting control signal ends EM2 of the driving circuits in the $Q^{th}$ row of sub pixels are electrically connected to the second light emitting control signal line in the $Q^{th}$ row. Q represents the total number of rows of sub pixels in the display area, $1 \le N \le Q$ may be made, and both N and Q are integers.

During specific implementation, in the embodiment of the present disclosure, the display apparatus may be any product or component with a display function, such as a mobile phone, a tablet computer, a television, a displayer, a notebook computer, a digital photo frame, and a navigator. It should be understood by those ordinarily skilled in the art that the display apparatus should have other essential constituent parts, which is not repeated here and should not be regarded as limitation to the present disclosure.

According to the driving circuit, the driving method therefor, and the display apparatus provided by the embodiments of the present disclosure, by responding to the first scanning signal of the $N^{th}$ row and the first light emitting control signal of the $N^{th}$ row, the first control circuit 10 may provide the initialization signal to the gate of the driving transistor M0 and the first electrode of the light emitting device L respectively, so as to simultaneously initialize the gate of the driving transistor M0 and the first electrode of the light emitting device L. By responding to the second scanning signal of the $N^{th}$ row, the data writing circuit 20 may provide the data signal to the driving transistor M0, so that the driving transistor M0 may generate the driving current according to the data signal, thereby causing the light emitting device L to emit the light under the control of the driving current.

Although the preferred embodiments of the present disclosure have been described, those skilled in the art can make additional alterations and modifications on these embodiments once they know the basic creative concept. Therefore, the appended claim intends to be explained as including the preferred embodiments and all alterations and modifications falling within the scope of the present disclosure.

Apparently, those skilled in the art can make various modifications and variations to the embodiments of the present disclosure without departing from the spirit and scope of the embodiments of the present disclosure. In this way, if these modifications and variations of the embodiments of the present disclosure fall within the scope of the claims of the present disclosure and their equivalent art, the present disclosure also intends to include these modifications and variations.

What is claimed is:

1. A driving circuit, comprising:
- a light emitting device, configured to emit light under control of a driving current;
- a driving transistor, comprising a first transistor, a second transistor, a third transistor, and a fourth transistor, and configured to generate the driving current according to a data signal; wherein:
  - a gate of the first transistor is directly connected to a first scanning signal end of an $N^{th}$ row, a first terminal of the first transistor is directly connected to the initialization signal end, and a second terminal of the first transistor is directly connected to a first terminal of the second transistor;
  - a gate of the second transistor is directly connected to a first light emitting control signal end of the $N^{th}$ row, and a second terminal of the second transistor is directly connected to a gate of the driving transistor;
  - a gate of the third transistor is directly connected to the first scanning signal end of the $N^{th}$ row, a first terminal of the third transistor is directly connected to the gate of the driving transistor, and a second terminal of the third transistor is directly connected to a second terminal of the driving transistor; and a gate of the fourth transistor is electrically connected to the first light emitting control signal end of the $N^{th}$ row, a first terminal of the fourth transistor is electrically connected to the second terminal of the driving transistor, and a second terminal of the fourth transistor is electrically connected to a first electrode of the light emitting device;

a first control circuit, configured to provide an initialization signal to the gate of the driving transistor and the first electrode of the light emitting device respectively in response to a first scanning signal of the $N^{th}$ row and a first light emitting control signal of the $N^{th}$ row, wherein N is an integer; and a data writing circuit, configured to provide the data signal to the driving transistor in response to a second scanning signal of the $N^{th}$ row.

2. The driving circuit according to claim 1, wherein the data writing circuit comprises a fifth transistor; and a gate of the fifth transistor is electrically connected to a second scanning signal end of the $N^{th}$ row, and a first terminal of the fifth transistor is electrically connected to a data signal end loading the data signal.

3. The driving circuit according to claim 1, wherein the driving circuit further comprises a second control circuit, configured to conduct a first power end with the driving transistor in response to a second light emitting control signal of the $N^{th}$ row.

4. The driving circuit according to claim 3, wherein the second control circuit comprises a sixth transistor; and a gate of the sixth transistor is electrically connected to a second light emitting control signal end of the $N^{th}$ row loading the second light emitting control signal, a first terminal of the sixth transistor is electrically connected to the first power end, and a second terminal of the sixth transistor is electrically connected to a first terminal of the driving transistor.

5. The driving circuit according to claim 1, further comprising a storage capacitor, wherein a first electrode plate of the storage capacitor is electrically connected to the gate of the driving transistor, and a second electrode plate of the storage capacitor is electrically connected to a first power end.

6. A display apparatus, comprising the driving circuit according to claim 1.

7. A driving method of the driving circuit according to claim 1, comprising:

at an initialization stage, controlling a level of the first scanning signal of the $N^{th}$ row to be a first level, a level of the second scanning signal of the $N^{th}$ row to be a second level, and a level of the first light emitting control signal of the $N^{th}$ row to be the first level, so that the first control circuit provides the initialization signal to the gate of the driving transistor and the first electrode of the light emitting device respectively;

at a data writing stage, controlling the level of the first scanning signal of the $N^{th}$ row to be the first level, the level of the second scanning signal of the $N^{th}$ row to be the first level, and the level of the first light emitting control signal of the $N^{th}$ row to be the second level, so that the data writing circuit provides the data signal to the driving transistor; and at a light emitting stage, controlling the level of the first scanning signal of the $N^{th}$ row to be the second level, the level of the second scanning signal of the $N^{th}$ row to be the second level, and the level of the first light emitting control signal of the $N^{th}$ row to be the first level, so that the driving transistor generates the driving current according to the data signal, and the light emitting device emits light under control of the driving current.

8. The driving method according to claim 7, wherein when the driving circuit further comprises a second control circuit, the driving method further comprises:

at the initialization stage, controlling a level of a second light emitting control signal of the $N^{th}$ row to be the second level;

at the data writing stage, controlling the level of the second light emitting control signal of the $N^{th}$ row to be the second level; and at the light emitting stage, controlling the level of the second light emitting control signal of the $N^{th}$ row to be the first level.

9. The driving method according to claim 7, wherein after the data writing stage and before the light emitting stage, the driving method further comprises:

at a first buffer stage, controlling the level of the first scanning signal of the $N^{th}$ row to be the second level, the level of the second scanning signal of the $N^{th}$ row to be the first level, and the level of the first light emitting control signal of the $N^{th}$ row to be the second level.

10. The driving method according to claim 9, wherein when the driving circuit further comprises a second control circuit, the method further comprises: at the first buffer stage, controlling a level of a second light emitting control signal of the $N^{th}$ row to be the second level.

11. The driving method according to claim 9, wherein after the first buffer stage and before the light emitting stage, the driving method further comprises:

at a second buffer stage, controlling the level of the first scanning signal of the $N^{th}$ row to be the second level, the level of the second scanning signal of the $N^{th}$ row to be the second level, and the level of the first light emitting control signal of the $N^{th}$ row to be the second level.

12. The driving method according to claim 11, wherein when the driving circuit further comprises a second control circuit, the method further comprises: at the second buffer stage, controlling a level of a second light emitting control signal of the $N^{th}$ row to be the first level.

13. A driving circuit, comprising: a driving transistor, a first transistor to a sixth transistor, and a storage capacitor, wherein a gate of the first transistor is directly connected to a first scanning signal end of an $N^{th}$ row, a first terminal of the first transistor is directly connected to an initialization signal end, and a second terminal of the first transistor is directly connected to a first terminal of the second transistor;

a gate of the second transistor is directly connected to a first light emitting control signal end of the $N^{th}$ row, and a second terminal of the second transistor is directly connected to a gate of the driving transistor;

a gate of the third transistor is directly connected to the first scanning signal end of the $N^{th}$ row, a first terminal of the third transistor is directly connected to the gate of the driving transistor, and a second terminal of the third transistor is directly connected to a second terminal of the driving transistor;

a gate of the fourth transistor is electrically connected to the first light emitting control signal end of the $N^{th}$ row, a first terminal of the fourth transistor is electrically connected to the second terminal of the driving transistor, and a second terminal of the fourth transistor is electrically connected to a first electrode of a light emitting device;

a gate of the fifth transistor is electrically connected to a second scanning signal end of the $N^{th}$ row, and a first terminal of the fifth transistor is electrically connected to a data signal end loading a data signal;

a gate of the sixth transistor is electrically connected to a second light emitting control signal end of the $N^{th}$ row loading a second light emitting control signal, a first terminal of the sixth transistor is electrically connected to a first power end, and a second terminal of the sixth transistor is electrically connected to a first terminal of the driving transistor; and a first electrode plate of the storage capacitor is electrically connected to the gate of the driving transistor, and a second electrode plate of the storage capacitor is electrically connected to the first power end.

* * * * *